United States Patent

Doshida

(10) Patent No.: US 9,229,401 B2
(45) Date of Patent: Jan. 5, 2016

(54) IMAGE FORMING APPARATUS

(71) Applicant: CANON KABUSHIKI KAISHA, Tokyo (JP)

(72) Inventor: Takaaki Doshida, Moriya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/672,042

(22) Filed: Mar. 27, 2015

(65) Prior Publication Data

US 2015/0277322 A1 Oct. 1, 2015

(30) Foreign Application Priority Data

Mar. 31, 2014 (JP) ................. 2014-072491

(51) Int. Cl.
- *G03G 15/16* (2006.01)
- *G03G 15/00* (2006.01)
- *H02P 8/14* (2006.01)
- *H02P 29/00* (2006.01)
- *G03G 15/01* (2006.01)

(52) U.S. Cl.
CPC ........ *G03G 15/5008* (2013.01); *G03G 15/0131* (2013.01); *G03G 15/1605* (2013.01); *H02P 8/14* (2013.01); *H02P 29/0005* (2013.01)

(58) Field of Classification Search
CPC .......... G03G 15/1615; G03G 15/5008; G03G 15/757; H02P 8/14; H02P 29/0005
See application file for complete search history.

(56) References Cited

U.S. PATENT DOCUMENTS

| | | | |
|---|---|---|---|
| 6,941,096 B2* | 9/2005 | Matsuda | G03G 15/5008 399/162 |
| 8,977,167 B2* | 3/2015 | Seki | G03G 15/0131 399/16 |
| 2009/0324262 A1* | 12/2009 | Matsuda | G03G 15/5008 399/36 |

FOREIGN PATENT DOCUMENTS

JP 2008-278620 A 11/2008

* cited by examiner

*Primary Examiner* — Gregory H Curran
(74) *Attorney, Agent, or Firm* — Canon U.S.A., Inc. IP Division

(57) ABSTRACT

An image forming apparatus calculates a speed correction amount obtained by correcting a gain and a phase of a speed fluctuation component by a gain phase correction unit and a correction speed calculation unit so as to cancel this speed fluctuation component and controls a rotation speed of a rotator by using the calculated speed correction amount.

9 Claims, 16 Drawing Sheets

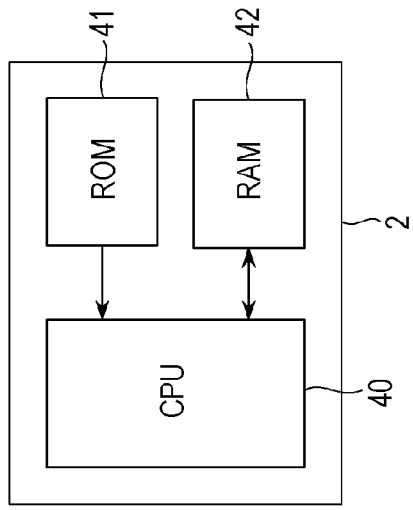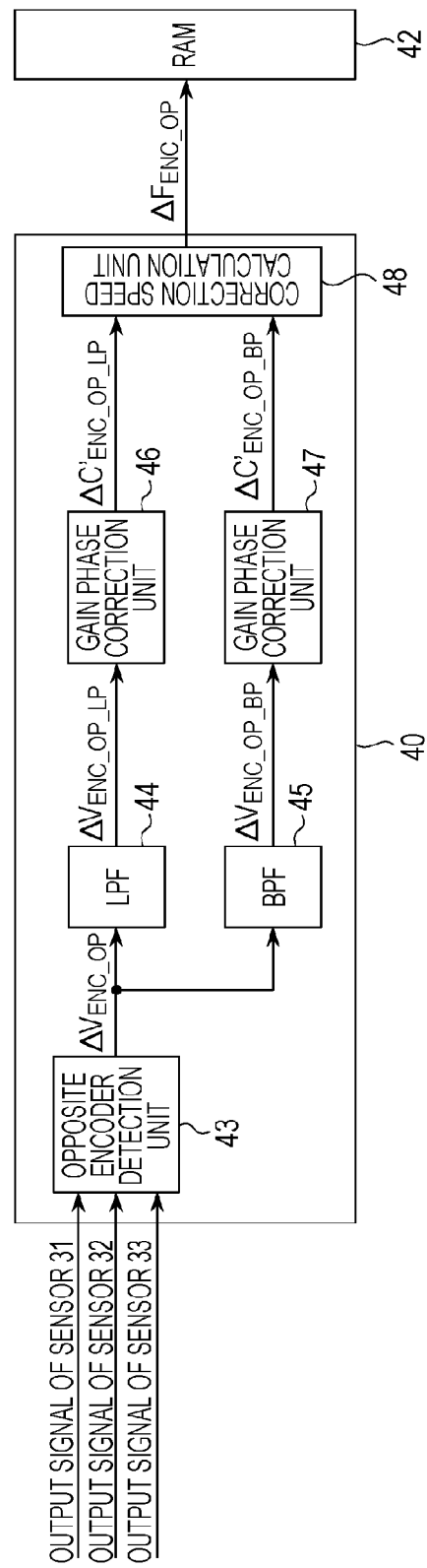

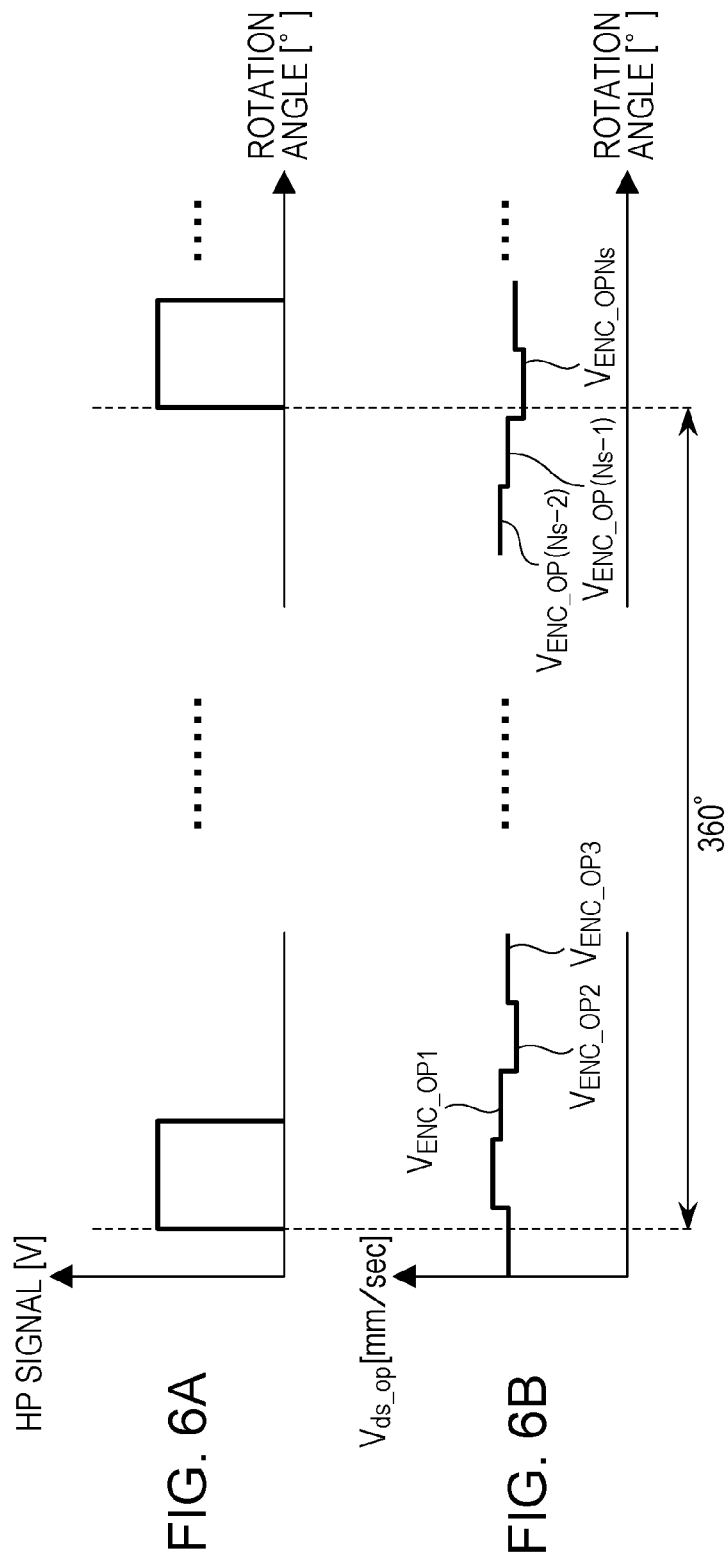

FIG. 7

| SLIT NUMBER | PHOTOSENSITIVE DRUM SURFACE SPEED |
|---|---|
| 1 | $V_{ENC\_OP1}$ |
| 2 | $V_{ENC\_OP2}$ |
| 3 | $V_{ENC\_OP3}$ |

⋮

| Ns-3 | $V_{ENC\_OP(Ns-3)}$ |
|---|---|
| Ns-2 | $V_{ENC\_OP(Ns-2)}$ |
| Ns-1 | $V_{ENC\_OP(Ns-1)}$ |
| Ns | $V_{ENC\_OPNs}$ |

FIG. 11

| ADDRESS | CORRECTION SPEED INSTRUCTION VALUE |
|---|---|
| address1 | $\Delta F_{ENC\_OP1}$ |
| address2 | $\Delta F_{ENC\_OP2}$ |
| address3 | $\Delta F_{ENC\_OP3}$ |
| ⋮ | ⋮ |
| address(Ns−1) | $\Delta F_{ENC\_OP(Ns-1)}$ |
| addressNs | $\Delta F_{ENC\_OPNs}$ |

42

IMAGE FORMING APPARATUS

BACKGROUND OF THE INVENTION

1. Field of the Invention

The present invention relates to an image forming apparatus.

2. Description of the Related Art

In an image forming apparatus of an electrophotographic system, a photosensitive drum and an intermediate transfer belt (hereinafter, will be referred to as "ITB") on which a toner image is borne are preferably driven such that a surface speed is set to be at a constant speed.

A reason therefor is that, when the surface speed of the photosensitive drum is fluctuated, a position to be exposed with light is shifted from a position on the photosensitive drum which is originally supposed to be exposed with light.

Another reason therefor is that also in a process for a primary transfer of a toner image formed on the photosensitive drum onto the ITB, in a case where an alternating current-like speed difference exists in the surface speed of the photosensitive drum and the ITB, a position of the toner image transferred onto the ITB is shifted from a position that is originally supposed to be transferred.

As a result, an image defect such as a color misregistration corresponding to positional misregistrations among respective colors or a banding corresponding to a periodic positional misregistration occurs on an image drawn on a recording paper.

For that reason, the speed of the photosensitive drum and the ITB is highly accurately controlled by controlling a speed of a motor functioning as a drive source for the photosensitive drum and the ITB by using a speed detection sensor.

A brushless direct-current motor (hereinafter will be referred to as "BLDC motor") is used as the motor in many cases since the BLDC motor is inexpensive, silent, and highly effective. In addition, a hybrid stepping motor is also adopted since a speed fluctuation hardly occurs by a disturbance.

A method of controlling a rotation speed of the photosensitive drum or the ITB to be constant by using the stepping motor includes a feed forward control (hereinafter, will be referred to as "FF control"). A periodic rotation fluctuation component generated by an eccentricity of shafts of a motor gear and a reduction gear is measured. Subsequently, a profile is created on the basis of the measurement result.

In the FF control, a speed fluctuation component extracted from the profile is extracted, and a speed correction value for cancelling the speed fluctuation component is generated, so that the generated speed correction value is added to a target speed instruction value.

A plurality of speed fluctuation components exist in the driving of the photosensitive drum or the ITB. In the FF control in the related art, the plurality of speed fluctuation components are not highly accurately controlled. In view of the above, Japanese Patent Laid-Open No. 2008-278620 proposes a method of gradually decreasing the speed fluctuation by repeatedly performing the FF control.

According to the technology disclosed in Japanese Patent Laid-Open No. 2008-278620, the FF control is to be repeatedly performed until the speed fluctuation falls within a target speed fluctuation amount, and a problem occurs that this repetition takes long time.

SUMMARY OF THE INVENTION

An image forming apparatus according to an aspect of the present invention includes: a drive unit that drives a rotator that rotates to form an image; a speed detection unit that detects a rotation speed of the rotator; a fluctuation component calculation unit that calculates a speed fluctuation component with respect to a previously set target speed on the basis of the rotation speed detected by the speed detection unit; a first filter processing unit that extracts a component having a first frequency from the speed fluctuation component; a second filter processing unit that extracts a component having a second frequency different from the first frequency from the speed fluctuation component; a first correction unit that performs a gain correction and a phase correction on the component extracted by the first filter processing unit; a second correction unit that performs a gain correction and a phase correction on the component extracted by the second filter processing unit; a speed correction amount calculation unit that calculates a speed correction amount by adding output values of the first correction unit and the second correction unit to each other; a storage unit that stores the speed correction amount while being associated with information related to a rotation position of the rotator; and a control unit that reads out the speed correction amount in accordance with the rotation position of the rotator from the storage unit and controls the rotation speed of the rotator on the basis of information related to the target speed of the rotator and the speed correction amount read out from the storage unit.

Further features of the present invention will become apparent from the following description of exemplary embodiments with reference to the attached drawings.

BRIEF DESCRIPTION OF THE DRAWINGS

FIG. 5A illustrates an outline configuration of a control device in FIG. 2, and FIG. 5B is a block diagram illustrating functions of processings performed by a CPU in FIG. 5A.

FIG. 6A illustrates an HP signal corresponding to a detection signal of HOME_POSITION, and FIG. 6B illustrates a drum surface speed in accordance with a rotation angle.

FIG. 7 illustrates a profile measurement result.

FIG. 11 illustrates a correction speed instruction value stored in a RAM in FIGS. 5A and 5B.

DESCRIPTION OF THE EMBODIMENTS

Figure 1:
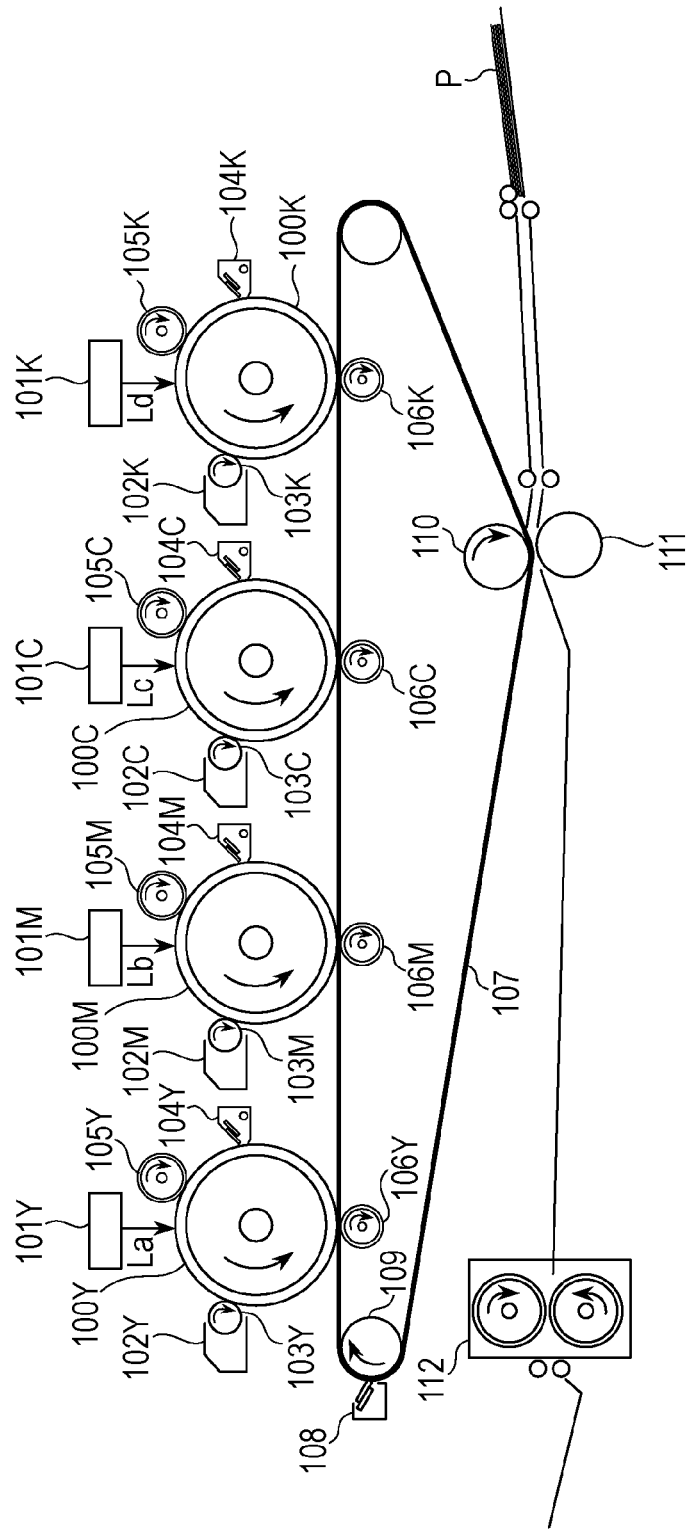
FIG. 1 is a cross sectional view of an image forming apparatus according to an exemplary embodiment.

FIG. 1 is a cross sectional view of an image forming apparatus 1000 according to the present exemplary embodiment.

In FIG. 1, the image forming apparatus 1000 can form images of four colors including yellow, magenta, cyan, and black. The image forming apparatus 1000 is provided with photosensitive drums and the like for the respective colors. In the following explanation, yellow is represented as Y, magenta is represented as M, cyan is represented as C, and black is represented as K. With regard to the configurations for forming the images of the respective colors, Y, M, C, and K are added to endings of reference symbols denoting the configurations. In a case where descriptions common to the configurations of the respective colors are made, reference symbols in which Y, M, C, and K are omitted are used.

When a host CPU that will be described below receives an image formation command on a recording paper P, the host CPU rotates a photosensitive drum 100, an intermediate transfer belt (hereinafter, will be referred to as "ITB") 107, a charging roller 105, a developing sleeve 103, a primary transfer roller 106, a secondary inner transfer roller 110, and a fixing roller of a fixing unit 112. The ITB 107 is driven by an ITB driving roller 109. A high voltage power source that is not illustrated in the drawing is connected to the charging roller 105 that is applied with a direct current voltage or a high voltage obtained by superposing a sinusoidal voltage on a direct current voltage. With this configuration, a front surface of the contacted photosensitive drum 100 is uniformly charged at a same potential as the direct current voltage supplied from the high voltage power source.

An exposure apparatus 101 exposes the front surface of the rotating photosensitive drum 100 with light in accordance with an image signal to form an electrostatic latent image on the photosensitive drum 100.

A potential of this electrostatic latent image is positive with respect to the developing sleeve 103 and is negative with respect to GND. The developing sleeve 103 of a developing device 102 is applied with a high voltage obtained by superposing a rectangular-wave voltage on a direct current voltage by the high voltage power source that is not illustrated in the drawing. The electrostatic latent image is developed by toner carrying a negative charge which is supplied by the developing sleeve 103 to form a toner image.

The toner images formed on the four photosensitive drums 100 are transferred by the primary transfer roller 106 onto the ITB 107 and further transferred by the secondary inner transfer roller 110 and a secondary outer transfer roller 111 onto the recording paper P. It is noted that the primary transfer roller 106 and the secondary inner transfer roller 110 are also applied with a direct current high voltage for transferring the toner images from the high voltage power source that is not illustrated in the drawing.

Residual toner remaining on the photosensitive drum 100 without being transferred onto the ITB 107 is scraped off by a cleaner 104 to be collected. Residual toner remaining on the ITB 107 without being transferred onto the recording paper P is scraped off by an intermediate transfer belt cleaner 108 to be collected.

The toner image transferred onto the recording paper P is applied with a pressure and a temperature by the fixing unit 112 to be fixed on the recording paper P. The recording paper P on which the toner image is fixed is discharged onto a discharge tray.

Next, a configuration related to driving of the photosensitive drum 100 and the ITB 107 will be described.

Figure 2:
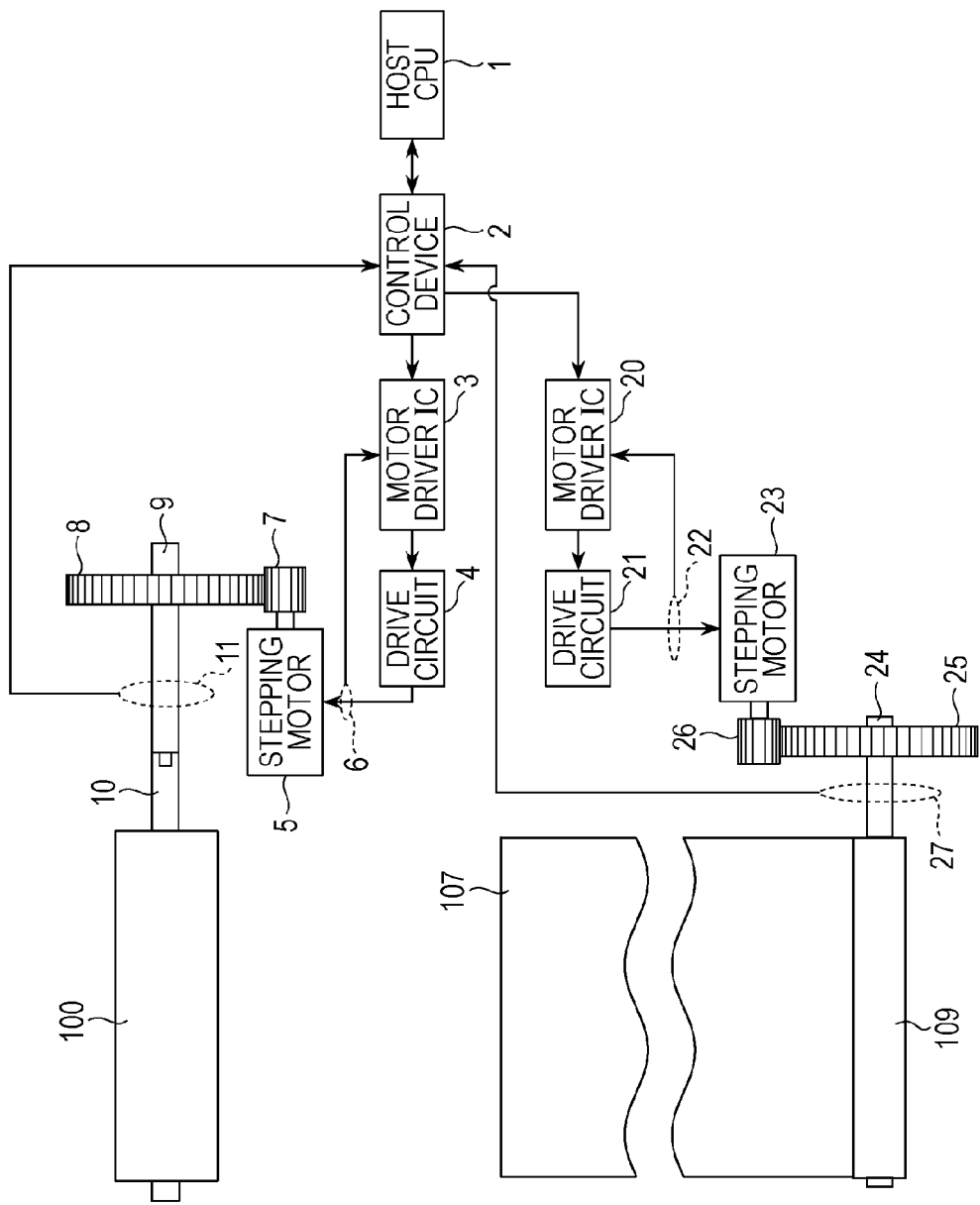
FIG. 2 illustrates a configuration for driving a photosensitive drum and an ITB.

FIG. 2 illustrates a configuration for driving the photosensitive drum 100 and the ITB 107. This configuration illustrated in FIG. 2 is common to the respective colors, and therefore Y, M, C, and K are not added to the reference symbols.

In FIG. 2, a rotation driving force by a stepping motor 5 is transmitted to a reduction gear shaft 9 via a motor shaft gear 7 and a reduction gear 8. Subsequently, the rotation driving force transmitted to the reduction gear shaft 9 is transmitted to the photosensitive drum 100 while the reduction gear shaft 9 and a photosensitive drum shaft 10 are mechanically joined to each other. The photosensitive drum 100 and the photosensitive drum shaft 10 are also joined to each other by a mechanical mechanism that is not illustrated in the drawings. With this configuration, the rotation driving force generated by the stepping motor 5 is transmitted to the photosensitive drum 100.

A host CPU 1 controls an entire operation of the image forming apparatus 1000. The host CPU 1 issues instructions related to a start timing of a rotation operation, a stop timing, and a rotation speed to a control device 2 to control the rotation operation of the photosensitive drum 100.

The control device 2 executes an activation speed control sequence and a stop speed control sequence. The activation speed control sequence is executed when the rotation operation of the photosensitive drum 100 is activated, and the speed is gradually increased from an activation speed to a target speed. The stop speed control sequence is executed when the rotation operation of the photosensitive drum 100 is stopped, and after the speed is gradually decreased from the target speed to a stop speed, the rotation operation is stopped.

Furthermore, the control device 2 executes a constant speed control for controlling the rotation speed of the photosensitive drum 100 to be a constant speed on the basis of rotation speed information output by an encoder 11 that functions as a rotation speed detection apparatus provided to the reduction gear shaft 9 after the rotation speed reaches the target speed by the activation speed control sequence. The speed control signal output from the control device 2 is input to a motor driver IC 3 as a drive pulse signal. A current detection apparatus 6 detects currents flowing in respective phases of the stepping motor 5. The motor driver IC 3 adjusts pulse width modulation (PWM) signals output to a drive circuit 4 such that the currents flowing in the respective phases are set to be constant on the basis of the currents detected by the current detection apparatus 6. In this manner, the constant speed control for controlling the rotation speed of the photosensitive drum 100 to be a constant speed is executed on the basis of the rotation speed information output by the encoder 11.

The encoder 11 detects a rotation speed of the photosensitive drum shaft 10. Fluctuation components of the rotation speed detected herein are mainly an eccentricity component of the shaft of the reduction gear 8 and an eccentricity component of the shaft of the motor shaft gear 7.

Next, a drive configuration of the ITB 107 will be described. A rotation driving force by a stepping motor 23 is transmitted to a driving roller shaft 24 via a motor shaft gear 26 and a reduction gear 25. A rotation control of the ITB 107 is controlled by the host CPU 1 similarly as in the photosensitive drum 100. To control the rotation operation of the ITB 107, the host CPU 1 issues instructions related to a start timing of the rotation operation, a stop timing, and a rotation speed to the control device 2. The speed control signal output from the control device 2 is input to a motor driver IC 20 as a drive pulse signal. A current detection apparatus 22 detects currents flowing in respective phases of the stepping motor 23. The motor driver IC 20 adjusts PWM signals output to a drive circuit 21 such that the currents flowing in the respective phases are set to be constant on the basis of the currents detected by the current detection apparatus 22. In this manner, the constant speed control for controlling the rotation speed of the ITB driving roller 109 to be a constant speed is executed on the basis of the rotation speed information output from an encoder 27.

Next, a principle of the operation for rotating the photosensitive drum 100 at a target rotation speed by using the stepping motor 5 will be described. The stepping motor 5 is driven in accordance with a frequency (Fstp [pulse per second]) of the drive pulse signal input to the motor driver IC 3.

In addition, in the stepping motor 5, a step angle θs [°] corresponding to a rotation angle per pulse is defined. Therefore, when a gear ratio of the motor shaft gear 7 and the reduction gear 8, a radius of the photosensitive drum 100, and a drum target surface speed corresponding to a target surface speed of the photosensitive drum 100 are determined, the necessary frequency Fstp is obtained by the following Expression (1).

$$Fstpt = 180 \times Vdts/(\pi r) \times Ng/\theta s \qquad \text{Expression (1)}$$

Fstpt: Frequency of the drive pulse signal at the drum target surface speed
Vdts: Drum target surface speed
r: Radius of the photosensitive drum 100
Ng: Gear ratio (the number of gear teeth of the reduction gear 8/the number of gear teeth of the motor shaft gear 7)

Herein, for example, a two-phase hybrid-type stepping motor is used as the stepping motor 5, a step angle becomes 1.8°. When a diameter of the photosensitive drum 100 is set as 80 mm, the drum target surface speed is set as 300 mm/sec, and the gear ratio is set as 9, Fstpd≈2149 is obtained.

It is however noted that, as described above, even when a constant rotation speed is realized on the motor shaft by fixing the drive pulse of the stepping motor 5, the rotation speed of the photosensitive drum shaft 10 does not become constant because of the eccentricity component of the shaft of the motor shaft gear 7 and the eccentricity component of the shaft of the reduction gear shaft 9.

Figure 3A:
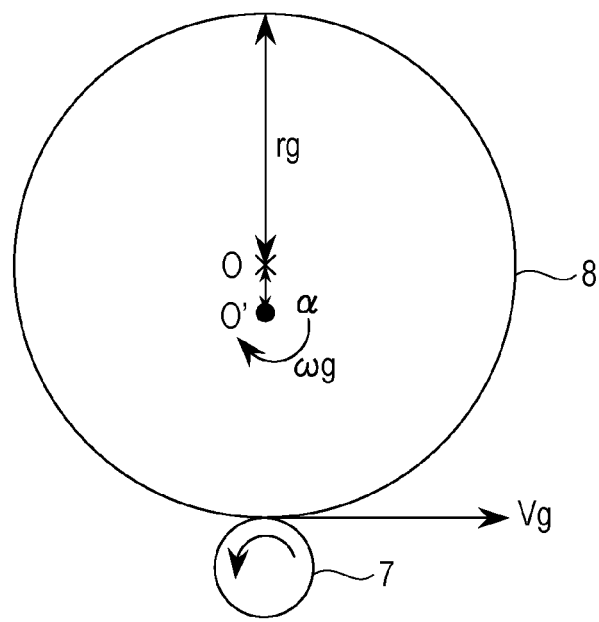
FIGS. 3A and 3B are explanatory diagrams for describing a rotation speed fluctuation derived from a shaft eccentricity of a reduction gear.
Figure 3B:
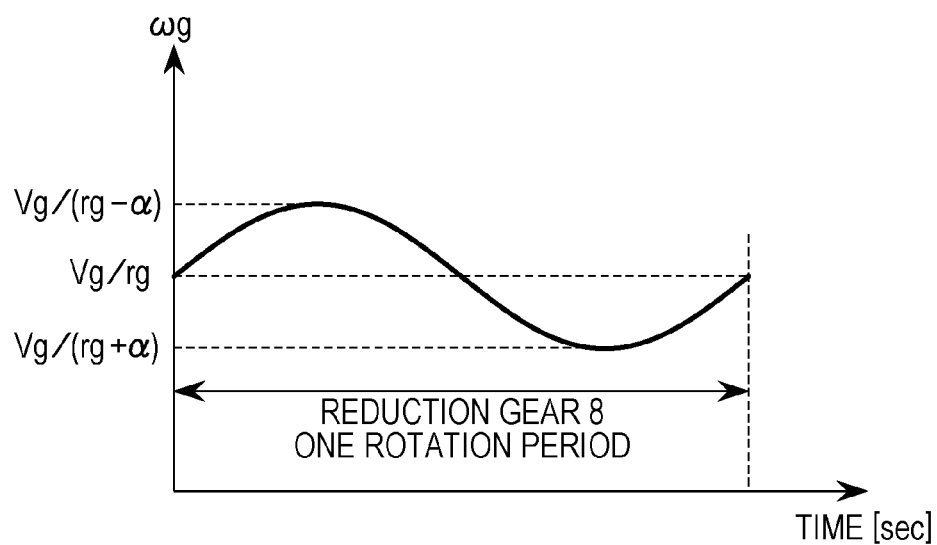

FIGS. 3A and 3B are explanatory diagrams for describing a rotation speed fluctuation derived from the shaft eccentricity of the reduction gear shaft 9.

FIG. 3A illustrates the reduction gear 8 as seen from the rotation shaft side. In a case where a rotation central axis O' is shifted from a center position O of the reduction gear 8 by α [mm], a rotation speed ωg about the rotation central axis O' does not become constant. It is noted that the surface speed of the reduction gear 8 in a joining part with the reduction gear shaft 9 is supposed to be constant.

FIG. 3B illustrates the rotation speed fluctuation when the reduction gear 8 completes one rotation. As illustrated in FIG. 3B, the rotation speed ωg becomes Vg/(rg−α) at a maximum and Vg/(rg+α) at a minimum, and a reduction gear shaft eccentricity component corresponding to a rotation speed fluctuation component is generated.

Under the same principle as the above, an eccentricity component of the shaft of the motor gear corresponding to a rotation speed fluctuation component is generated from the eccentricity of the shaft of the motor shaft gear 7 too.

This rotation fluctuation component is derived from dimension errors of the parts and is unique to each of the manufactured reduction gear 8 and the motor shaft gear 7. Therefore, a temporal change of the rotation fluctuation component is small, and the rotation fluctuation component is stationary.

At the time of designing of the image forming apparatus 1000, a process speed corresponding to the target surface speed as the surface speed of the ITB 107 is determined first. Subsequently, a drive pulse frequency of the stepping motor 23 is determined on the basis of the target surface speed, the radius of the ITB 107, the gear ratio of the motor shaft gear 26 and the reduction gear 25, and the thickness of the ITB 107. With regard to the rotation drive of the ITB 107 too, similarly as in the photosensitive drum 100, the rotation fluctuation component derived from the eccentricity component of the reduction gear shaft and the eccentricity component of the motor gear shaft is generated. This rotation fluctuation component is also derived from dimension errors of the parts and is unique to each of the manufactured reduction gear 8 and the motor shaft gear 7. Therefore, a temporal change of this rotation fluctuation component is also small, the rotation fluctuation component is stationary. In this manner, the rotation fluctuation component in the rotation drive of the photosensitive drum 100 and the ITB 107 is stationary. Thus, a rotation fluctuation based on the eccentricity component of the reduction gear shaft and the eccentricity component of the motor shaft is previously measured, and a profile is created. Subsequently, a correction speed instruction value for cancelling this rotation fluctuation is generated, so that the rotation fluctuation derived from the eccentricity component of the reduction gear shaft which is generated in the photosensitive drum shaft 10 and the eccentricity component of the motor shaft can be suppressed.

A method of generating the correction speed instruction value to suppress this rotation fluctuation will be hereinafter described by using processing related to the photosensitive drum 100. Similar processing is performed with respect to the ITB 107.

Figure 4A:
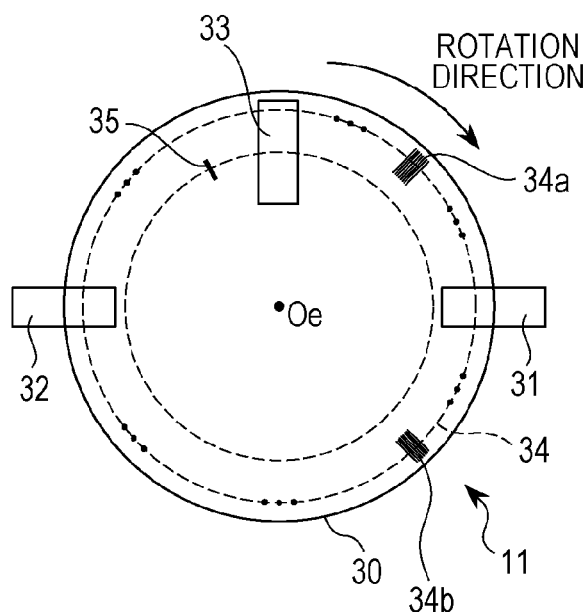
FIGS. 4A to 4D are explanatory diagrams for describing a rotation speed detection method.

FIGS. 4A to 4D are explanatory diagrams for describing a rotation speed detection method. FIG. 4A illustrates a configuration of the encoder 11. In FIG. 4A, the encoder 11 is drawn from the reduction gear shaft 9 side, and a wheel of the encoder 11 rotates in a rotation direction indicated by an arrow. The encoder 11 is constituted by a wheel 30 and sensors 31, 32, and 33. Herein, the wheel 30 is a thin disk-like member, and stainless steel or plastic is used as its material in many cases. According to the present exemplary embodiment, descriptions will be given as an example while stainless steel is used as the material. The wheel 30 is connected to the reduction gear shaft 9 at its rotation center part (0e), and when the reduction gear shaft 9 rotates, the wheel 30 rotates at the same rotation speed as the rotation speed of the reduction gear shaft 9. Slits 34 are formed in the wheel 30. The slits 34 are longitudinal holes (hereinafter, will be referred to as "windows") and are formed at an equal interval in a circumferential direction of the wheel 30. In FIG. 4A, slits 34a and 34b are illustrated as an example of a slit group. In an actual wheel, the slits represented by the slits 34a and 34b are formed at an equal interval on an entire circumference.

The sensors 31 and 32 detect the slits 34. The sensors 31 and 32 are provided at positions shifted by half a circumference, and the two sensors 31 and 32 are provided so as to cancel a shaft eccentricity component of the wheel 30. The sensors 31 and 32 are linearly arranged substantially on a straight line passing through an ideal center of a the wheel 30. The windows constituting the slits 34 and shielding parts other than the windows (hereinafter, will be referred to as "walls") are arranged at an equal interval with respect to the rotation direction. The sensors 31 and 32 detect the slits 34. The rotation speed can be calculated on the basis of this detection result.

Furthermore, the wheel 30 is provided with a window 35 representing HOME_POSITION corresponding to a reference position of the rotation shaft at one location in a circumferential direction of the wheel 30. The sensor 33 detects the window 35.

Figure 4B:
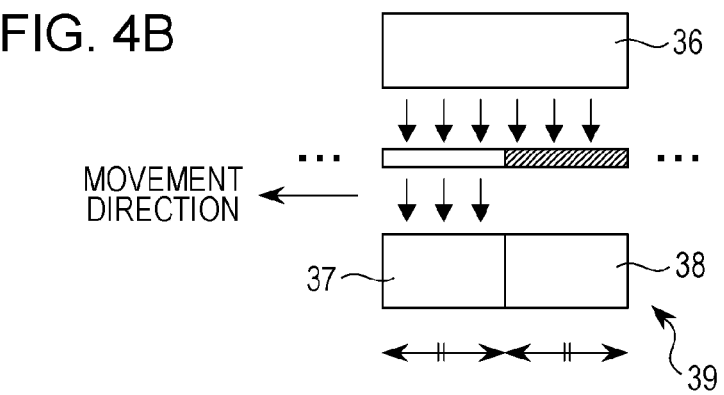

FIG. 4B is an explanatory diagram for describing a principle in which the slits 34 are detected by the sensors 31 and 32. In FIG. 4B, the sensors 31 and 32 are drawn from a direction perpendicular to the rotation shaft of the reduction gear shaft 9.

Since the sensor 31 and the sensor 32 have the same configuration, the configuration of the sensor 31 will be described. The sensor 31 includes a light emission unit 36 and a light reception unit 39. The wheel 30 is arranged between the light emission unit 36 and the light reception unit 39. Furthermore, the light reception unit 39 is constituted by two light reception sections 37 and 38. A length between the light reception section 37 and the light reception section 38 is equal to a length of the window constituting the slit 34 or the wall. The light reception sections 37 and 38 output voltages in proportion to light reception amounts.

In an area where the window exists in the slit 34, light from the light emission unit 36 is incident on the light reception unit 39, but in an area where no window exists, the light from the light emission unit 36 is shielded by the wheel 30 and is not incident on the light reception unit 39. When the sensor 33 detects the window 35, HOME_POSITION can be detected.

Figure 4C:
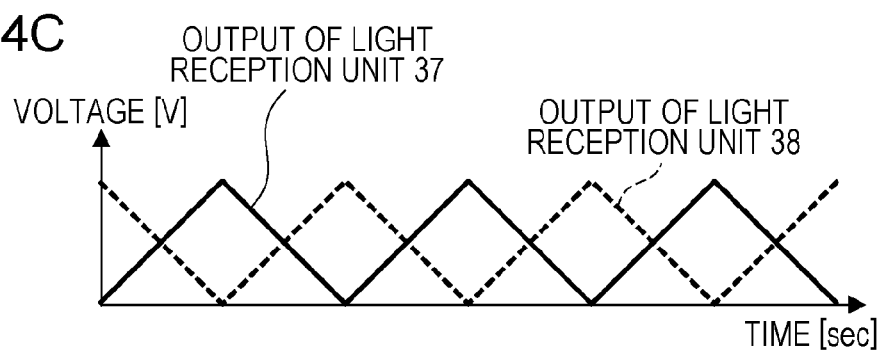

FIG. 4C illustrates outputs of the light reception section 37 and the light reception section 38. A vertical axis indicates a voltage, and a horizontal axis indicates a time. FIG. 4C illustrates changes of the output voltages that are output in accordance with the amounts of the lights incident on the light reception sections 37 and 38 caused by the rotation movement of the wheel 30.

Figure 4D:
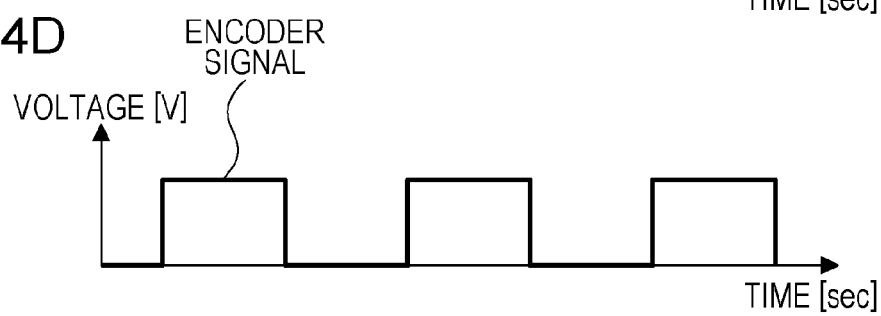

FIG. 4D illustrates a result of comparator processing performed by the control device 2 to which the voltage output from each of the light reception sections 37 and 38 is input. A vertical axis indicates a voltage, and a horizontal axis indicates a time. In this comparator processing, the output of the light reception section 37 is compared with the output of the light reception section 38, and it is detected that the output of the light reception section 37 is larger than the output of the light reception section 38. As illustrated in FIG. 4D, the output from the comparator becomes a pulse signal (hereinafter, will be referred to as "encoder signal"). Since a time $T_{ENC\_b}$ from a rising of this encoder signal until the next rising is equivalent to a time that has elapsed while a rotation by a distance corresponding to one slit of the encoder is made, a surface speed Vds of the photosensitive drum 100 can be obtained by using the following Expression (2).

Hereinafter, the time from the rising of the encoder signal until the next rising will be referred to as encoder detection time.

$$Vds = 2\pi r_d/(N_S \times T_{ENC\_b}) \quad (2)$$

Ns: Number of the slits
$T_{ENC\_b}$: Encoder detection time by the sensor 31
$r_d$: Radius of the photosensitive drum Similarly, an encoder detection time $T_{ENC\_C}$ by the sensor 32 can also be obtained.

A surface speed Vds_op of the photosensitive drum 100 is calculated by the following Expression (3) from the encoder detection time $T_{ENC\_b}$ obtained from the output of the sensor 31 and the encoder detection time $T_{ENC\_C}$ obtained from the output of the sensor 32.

$$Vds\_op = 2\pi r_d/(N_S \times (T_{ENC\_b} + T_{ENC\_C})/2) \quad (3)$$
$$= 2\pi r_d/T_{ENC\_OP}$$
$$T_{ENC\_OP} = (T_{ENC\_b} + T_{ENC\_C})/2$$

$T_{ENC\_C}$: Encoder detection time by the sensor 32
$T_{ENC\_OP}$: Opposite encoder detection time in which the shaft eccentricity component is cancelled and which can be obtained by using the encoder detection time $T_{ENC\_b}$ obtained from the output of the opposite encoder detection time sensor 31 and the encoder detection time $T_{ENC\_C}$ obtained from the output of the sensor 32.

According to the present exemplary embodiment, the above-described processing is performed for each $T_{ENC\_b}$, and the surface speed Vds_op of the photosensitive drum 100 is obtained. Subsequently, the processing of obtaining the surface speed Vds_op of the photosensitive drum 100 is repeated from when the sensor detects HOME_POSITION until when the sensor detects the next HOME_POSITION.

FIG. 5A illustrates an outline configuration of the control device 2 in FIG. 2.

In FIG. 5A, the control device 2 includes a CPU 40, a ROM 41, and a RAM 42. The CPU 40 controls the entirety of the control device 2. The ROM 41 stores a program executed by the CPU 40 and the like. The RAM 42 stores various data and is used as a work area for the CPU 40. FIG. 5B is a block diagram illustrating a function of processing performed by the CPU 40 in FIG. 5A. In FIG. 5B, the processing performed by the CPU 40 includes an opposite encoder detection unit 43, a low-pass filter (LPF) 44, a band-pass filter (BPF) 45, gain phase correction units 46 and 47, and a correction speed calculation unit 48. Various signals illustrated in FIG. 5B will be described in detail below.

The output signals of the sensors 31, 32, and 33 are input to the opposite encoder detection unit 43. The opposite encoder detection unit 43 calculates the surface speed Vds_op on the basis of the output values of the sensor 31 and the sensor 32. Subsequently, the drum target surface speed Vdts is subtracted from the surface speed Vds_op to obtain a speed fluctuation component $\Delta V_{ENC\_OP}$.

Subsequently, the speed fluctuation component $\Delta V_{ENC\_OP}$ is output to the LPF 44 and the BPF 45.

Filter processing is performed on the input $\Delta V_{ENC\_OP}$ by using the LPF 44, and the processing result is output to the gain phase correction unit 46 as a speed fluctuation component $\Delta V_{ENC\_OP\_LP}$. Filter processing is performed on the input $\Delta V_{ENC\_OP}$ by using the BPF 45, and the processing result is output to the gain phase correction unit 47 as a speed fluctuation component $\Delta V_{ENC\_OP\_BP}$. The LPF 44 and the BPF 45 correspond to filter processing units in which the filter processing is performed on the calculated speed fluctuation component by using the previously set filter.

The gain phase correction unit 46 performs a gain correction and a phase correction on $\Delta V_{ENC\_OP\_LP}$ and outputs the result to the correction speed calculation unit 48 as a speed correction amount $\Delta C'_{ENC\_OP\_LP}$.

The gain phase correction unit 47 performs the gain correction and the phase correction on $\Delta V_{ENC\_OP\_BP}$ and outputs the result to the correction speed calculation unit 48 as a speed correction amount $\Delta C'_{ENC\_OP\_BP}$.

The correction speed calculation unit 48 adds $\Delta C'_{ENC\_OP\_LP}$ and $\Delta C'_{ENC\_OP\_BP}$ to each other to obtain $C'_{ENC\_OP}$. Subsequently, a drive pulse frequency $\Delta F_{ENC\_OP}$ obtained by converting $C'_{ENC\_OP}$ into a drive pulse frequency of the stepping motor 5 is stored in the RAM 42. This drive pulse frequency $\Delta F_{ENC\_OP}$ is the correction speed instruction value. This conversion can be realized by using $\Delta F_{ENC\_OP}$ instead of Vdts in Expression (1). Hereinafter, the processing executed by the above-described configuration according to the present exemplary embodiment will be described. First, a profile measurement will be described. FIG. 6A illustrates an HP signal corresponding to a detection signal of HOME_POSITION, and FIG. 6B illustrates a drum surface speed in accordance with a rotation angle.

In the profile measurement, to correspond to the one rotation of the photosensitive drum 100, the measurement is started at the rising start point of the HP signal, and the measurement is stopped at the next rising of the HP signal. The drum surface speed $V_{ENC\_OP}$ is output during the rotation of the photosensitive drum 100 as illustrated in FIG. 6B. The number of $V_{ENC\_OP}$ to be output is $N_S$ corresponding to the number of the slits 34, and numbering is performed such that the respective slits 34 can be identified at the rising start point of the HP signal. Therefore, after the profile measurement, the rotation speed fluctuation amount corresponding to the respective slits 34 can be measured. That is, the slit number where the rising of the HP signal is set as the starting point is information indicating the rotation position of the photosensitive drum.

FIG. 7 illustrates a profile measurement result.

According to the profile measurement result of FIG. 7, the surface speed of the photosensitive drum 100 at that time is indicated while corresponding to the slit number set after the numbering. A method of calculating the correction speed instruction value will be described by using this profile measurement result $V_{ENC\_OP}$ has a detection error component such as an error of a length of the slits 34. In general, to accurately measure the rotation fluctuation component based on the motor shaft eccentricity component or the like, Ns is set as a high value, and therefore a high frequency rotation speed fluctuation component is generated.

In view of the above, to cut the high frequency component from $V_{ENC\_OP}$ and also to individually take out the reduction gear shaft eccentricity component and the motor shaft eccentricity component, the LPF 44 and the BPF 45 described above are respectively provided. In this manner, the two types of filters are provided. One of the filter passes the frequency of the eccentricity component of the shaft of the reduction gear connected to the rotator, and the other filter passes the frequency of the eccentricity component of the shaft of the drive unit. A reason why the reduction gear shaft eccentricity component and the motor shaft eccentricity component are individually taken out by using the LPF 44 and the BPF 45 is that a response characteristic of a load system differs depending on a frequency.

Figure 8A:
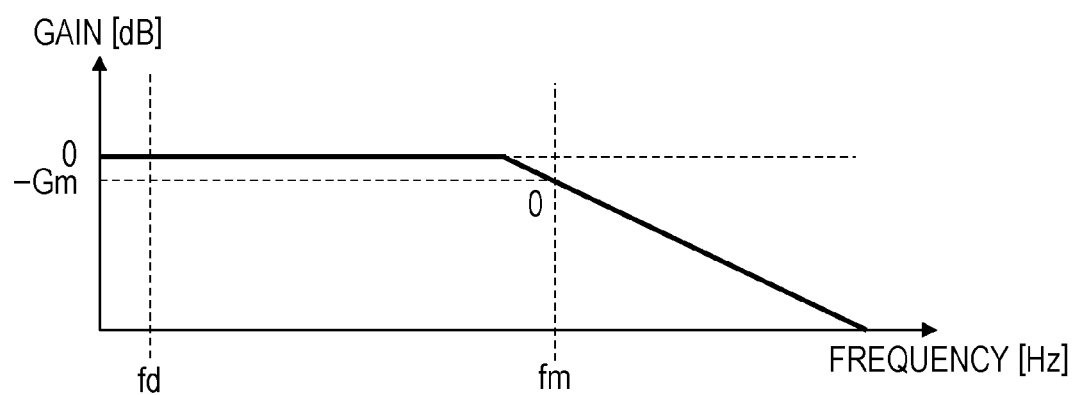
FIGS. 8A and 8B illustrate a frequency response characteristic in a case where an input is set as a rotation speed of a motor shaft, and an output is set as a rotation speed of the photosensitive drum.
Figure 8B:
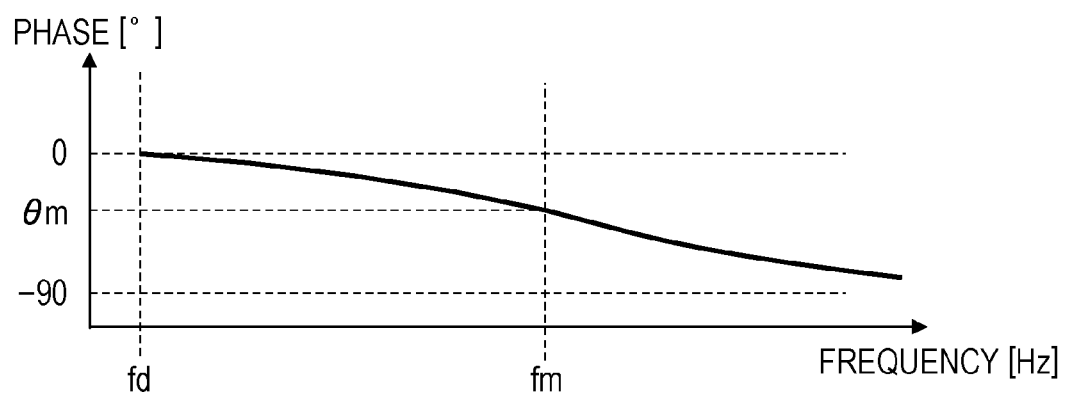

FIGS. 8A and 8B illustrate a frequency response characteristic in a case where an input is set as the rotation speed of the motor shaft, and an output is set as the rotation speed of the photosensitive drum 100. In FIG. 8A, a vertical axis indicates a gain, and a horizontal axis indicates a frequency, and in FIG. 8B, a vertical axis indicates a phase, and a horizontal axis indicates a frequency. Fd denotes a frequency of the reduction gear shaft eccentricity component, and Fm denotes a frequency of the motor shaft eccentricity component.

The response characteristic of the load system is determined depending on mechanical materials such as the reduction gear 8, the reduction gear shaft 9, the photosensitive drum shaft 10, and the photosensitive drum 100, and in general, a mechanical frequency characteristic of a rotation system is indicated by a first-order lag system. According to the present exemplary embodiment, since a gear ratio is set as 9, the frequency Fm is a frequency nine times as high as Fd.

As illustrated in FIGS. 8A and 8B, a gain is 0 [dB], and a phase delay is substantially 0 [deg] at Fd. On the other hand, a gain is −Gm [dB], and a phase delay is θm [°] at Fm. Therefore, if a gain correction and a phase correction are not performed, a sufficient suppression of the speed fluctuation is not to be expected by the correction speed instruction value input to cancel the motor shaft eccentricity component. For this reason, in the generation of the correction speed instruction value, each rotation fluctuation component is individually taken out, and the appropriate gain correction and the appropriate phase correction are performed in accordance with the frequency characteristic illustrated in FIGS. 8A and 8B. Then, the rotation fluctuation components are to be added to each other.

Figure 9A:
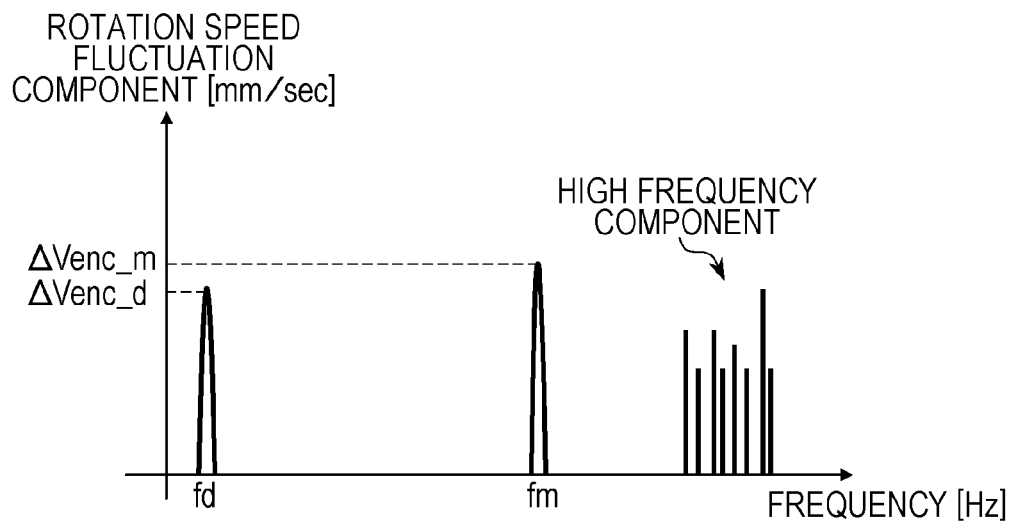
FIGS. 9A and 9B illustrate a rotation speed fluctuation component and filter characteristics of an LPF and a BPF.
Figure 9B:
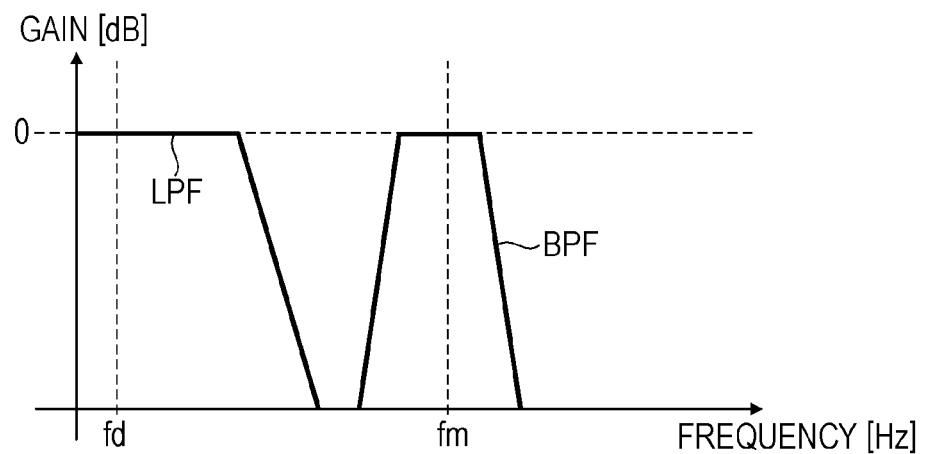

FIGS. 9A and 9B illustrate the rotation speed fluctuation component and filter characteristics of the LPF 44 and the BPF 45. In FIG. 9A, a vertical axis indicates the rotation speed fluctuation component detected by the encoder 11, and a horizontal axis indicates a frequency. As illustrated in FIG. 9A, the rotation speed fluctuation component is also generated at the frequencies Fd and Fm other than the high frequency component. FIG. 9B illustrates a filter characteristics of the LPF 44 and the BPF 45. As illustrated in FIG. 9B, the LPF 44 and the BPF 45 each function as the filter provided with a gain characteristic for taking out each of the rotation fluctuation component. That is, a gain in a frequency area to be taken out is set as 0 [dB], and the other gain is set to be as low as possible (for example, −80 [dB]). The filter for taking out Fd is the LPF 44, and the filter for taking out Fm is the BPF 45.

FIGS. 10A to 10G are explanatory diagrams for describing a method of obtaining the correction speed instruction value from the speed fluctuation component.

A vertical axis in each of graphic representations illustrated in FIGS. 10A to 10G indicates a speed component, and a horizontal axis in each graphic representation indicates a rotation angle.

Figure 10A:
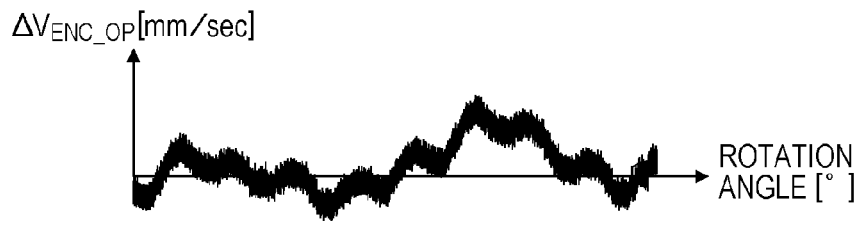
FIGS. 10A to 10G are explanatory diagrams for describing a method of obtaining a correction speed instruction value from a speed fluctuation component.

FIG. 10A illustrates the fluctuation component $\Delta V_{ENC\_OP}$ of the surface speed $V_{ENC\_OP}$ obtained by using the encoder 11 from the viewpoint of the rotation angle while the rising of the HP signal is set as the start point.

Figure 10B:
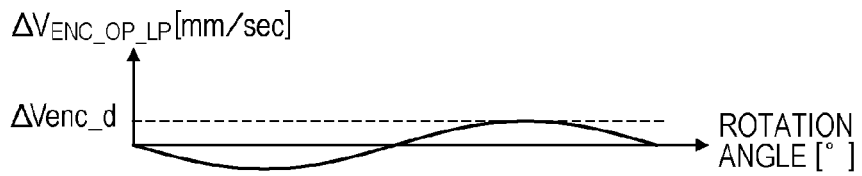
Figure 10C:
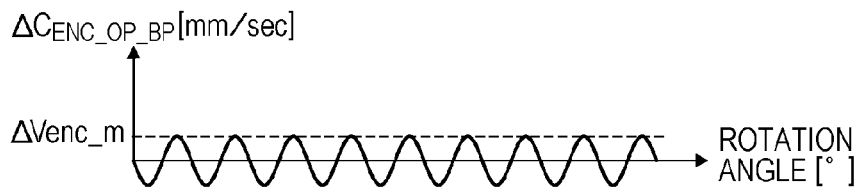

FIG. 10B illustrates the rotation speed fluctuation component $\Delta V_{ENC\_OP\_LP}$ after the filter processing is performed by using the LPF 44 from the viewpoint of the rotation angle at the rising start point of the HP signal.

FIG. 10O illustrates the rotation speed fluctuation component $\Delta V_{ENC\_OP\_BP}$ after the filter processing is performed by using the BPF 45 from the viewpoint of the rotation angle at the rising start point of the HP signal.

Figure 10D:
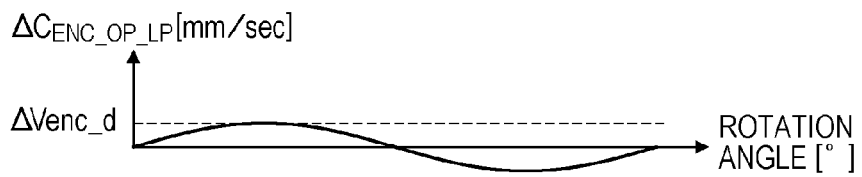
Figure 10E:
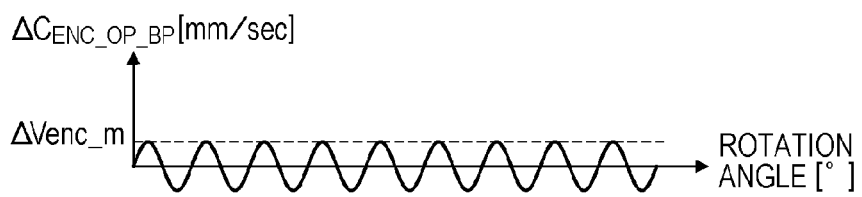

FIGS. 10D and 10E illustrate correction amounts for cancelling these rotation speed fluctuation components. FIG. 10D illustrates a speed correction amount $\Delta C_{ENC\_OP\_LP}$ generated by shifting the phase of the graphic representation of FIG. 10B by 180°. FIG. 10E illustrates a speed correction amount $\Delta C_{ENC\_OP\_BP}$ generated by shifting the phase of the graphic representation of FIG. 10C by 180°.

Figure 10F:
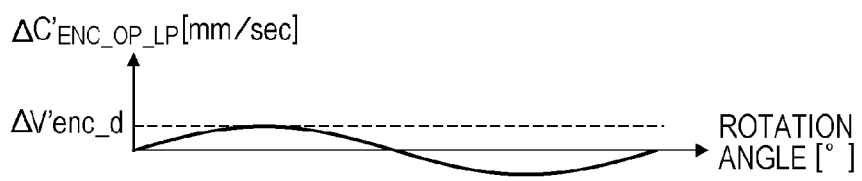
Figure 10G:
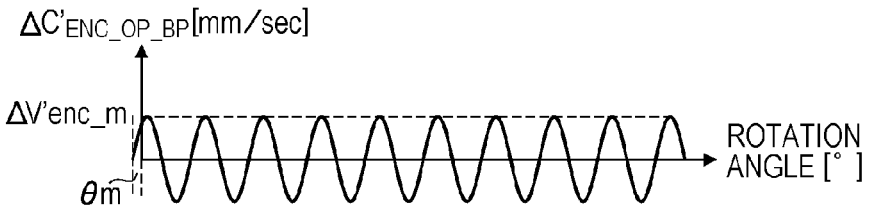

FIGS. 10F and 10G illustrate speed correction amounts readjusted while a gain characteristic and a phase characteristic of the load system are taken into account. FIG. 10F illustrates the readjusted speed correction amount $\Delta C'_{ENC\_OP\_LP}$. FIG. 10G illustrates the readjusted speed correction amount $\Delta C'_{ENC\_OP\_BP}$. In this manner, the gain phase correction units 46 and 47 and the correction speed calculation unit 48 calculate the speed correction amount by correcting the gain and the phase of the speed fluctuation component so as to cancel the speed fluctuation component that has been subjected to the filter processing.

Subsequently, as described above, the correction speed calculation unit 48 adds $\Delta C'_{ENC\_OP\_LP}$ to $\Delta C'_{ENC\_OP\_BP}$ and outputs $\Delta F_{ENC\_OP}$ converted into the drive pulse frequency of the stepping motor 5 to the RAM 42. $\Delta F_{ENC\_OP}$ that is the correction speed instruction value is stored in each of the addresses corresponding to the numbers of the slits 34 in the RAM 42.

FIG. 11 illustrates the correction speed instruction value stored in the RAM 42 in FIGS. 5A and 5B. As illustrated in FIG. 11, the correction speed instruction value corresponding to each of $N_s$ addresses corresponding to the numbers of the slits 34 is stored. According to the present exemplary embodiment, since four photosensitive drums 100 are provided, four sets of the correction speed instruction values are stored.

With this configuration, the CPU 40 reads out the correction speed instruction value corresponding to the number of the slit 34 from the timing at which the HP signal is detected.

Figure 12:
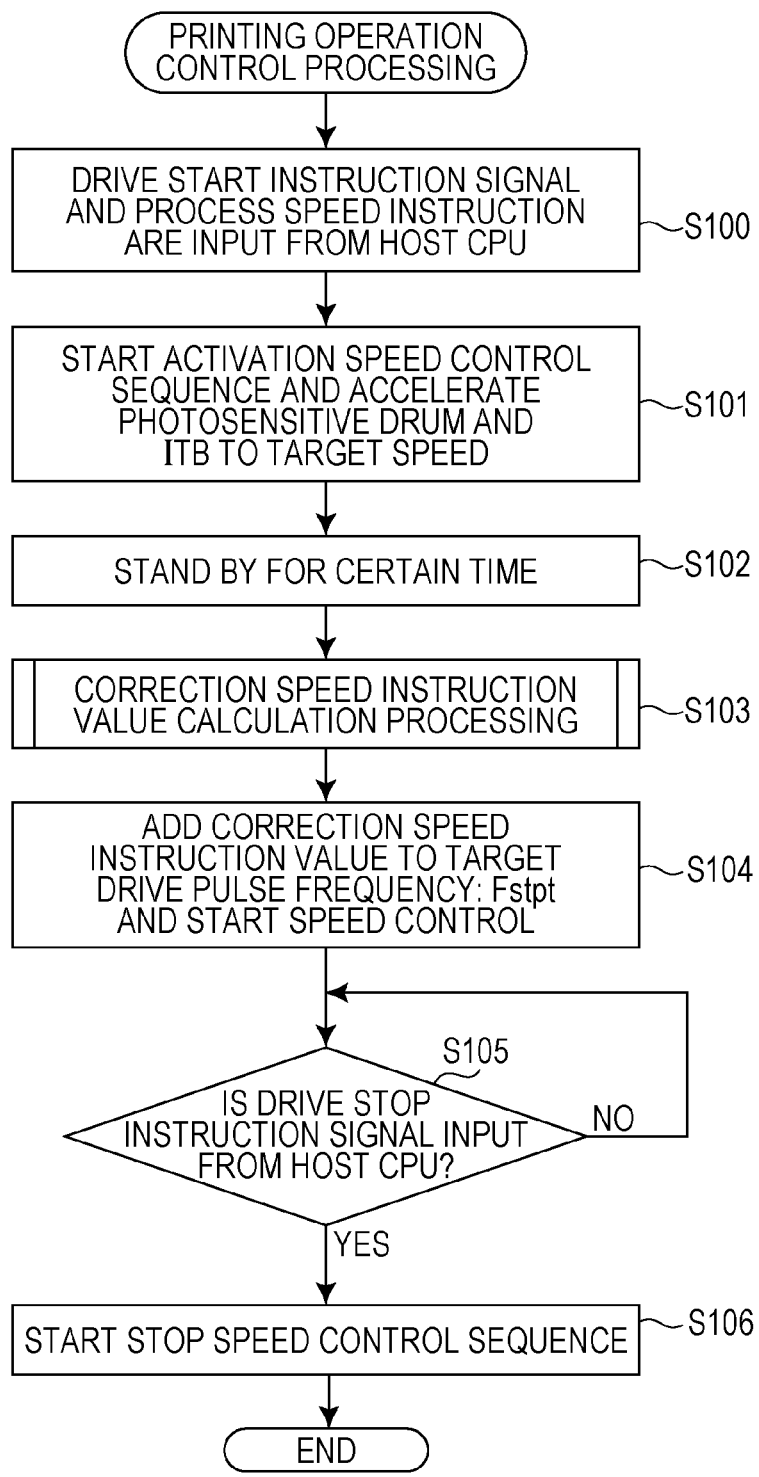
FIG. 12 is a flow chart for a procedure of printing operation control processing executed by the CPU in FIG. 5A.

Descriptions will be given of printing operation control processing for actually performing printing while the above-described speed control is performed. FIG. 12 is a flow chart for a procedure of the printing operation control processing executed by the CPU 40 in the control device 2.

The printing operation control processing illustrated in FIG. 12 is executed while a print instruction from a user interface or a PC is input to the host CPU 1. In FIG. 12, in the CPU 40, a drive start instruction signal and a process speed instruction are input from the host CPU 1 (step S100). The process speed instruction is determined depending on information (such as heavy paper or normal paper) related to a type of a recording paper mainly set by the user interface.

The CPU 40 then starts the activation speed control sequence and accelerates the photosensitive drum 100 and the ITB 107 to a target speed (step S101). When the speed reaches the target speed, the CPU 40 stands by for a certain time until the rotation fluctuations of the photosensitive drum 100 and the ITB 107 are stabilized (step S102). This is because, if the operation is started at the target frequency Fstpt with respect to the stepping motor 5 from the beginning, a torque of the stepping motor 5 is not sufficient, and a loss of synchronism occurs in which the rotation operation is stopped. For that reason, the CPU 40 outputs the drive pulse signal to the motor driver IC 3 on the basis of the drive pulse frequency at which the stepping motor 5 can first generate a torque determined by a total value of an acceleration torque and a load torque. Subsequently, the CPU 40 gradually increases the drive pulse frequency to the target frequency Fstpt. After the drive frequency reaches the target frequency Fstpt, the CPU 40 start measurement of the profile. It is noted that a rotation fluctuation called overshoot occurs immediately after the drive frequency reaches Fstpt since the acceleration torque disappears. Thus, the CPU 40 waits and then starts the profile measurement when the rotation speed is stabilized.

The CPU 40 performs correction speed instruction value calculation processing for calculating the correction speed instruction value $\Delta F_{ENC\_OP}$ (step S103).

Thereafter, the CPU 40 performs the FF control on the photosensitive drum by using the correction speed instruction value calculated in step S103. The CPU 40 reads out the correction speed instruction value $\Delta F_{ENC\_OP}$ corresponding to the slit number detected by the encoder 11 from the RAM 42. Subsequently, the CPU 40 adds the correction speed instruction value $\Delta F_{ENC\_OP}$ to Fstpt corresponding to the target drive pulse frequency of the photosensitive drum. The CPU 40 generates the drive pulse signal on the basis of the drive frequency corresponding to this addition result to be output to the motor driver IC (step S104).

As described above, the timing for starting this speed control is the timing at which the HP signal is detected. A printing operation instructed in step S100 is executed after this speed control is started.

When a drive stop instruction signal is input from the host CPU 1 (step S105: YES), the stop speed control sequence is started (step S106). Then, the photosensitive drum 100 and the ITB 107 are stopped, and the present processing is ended.

Figure 13:
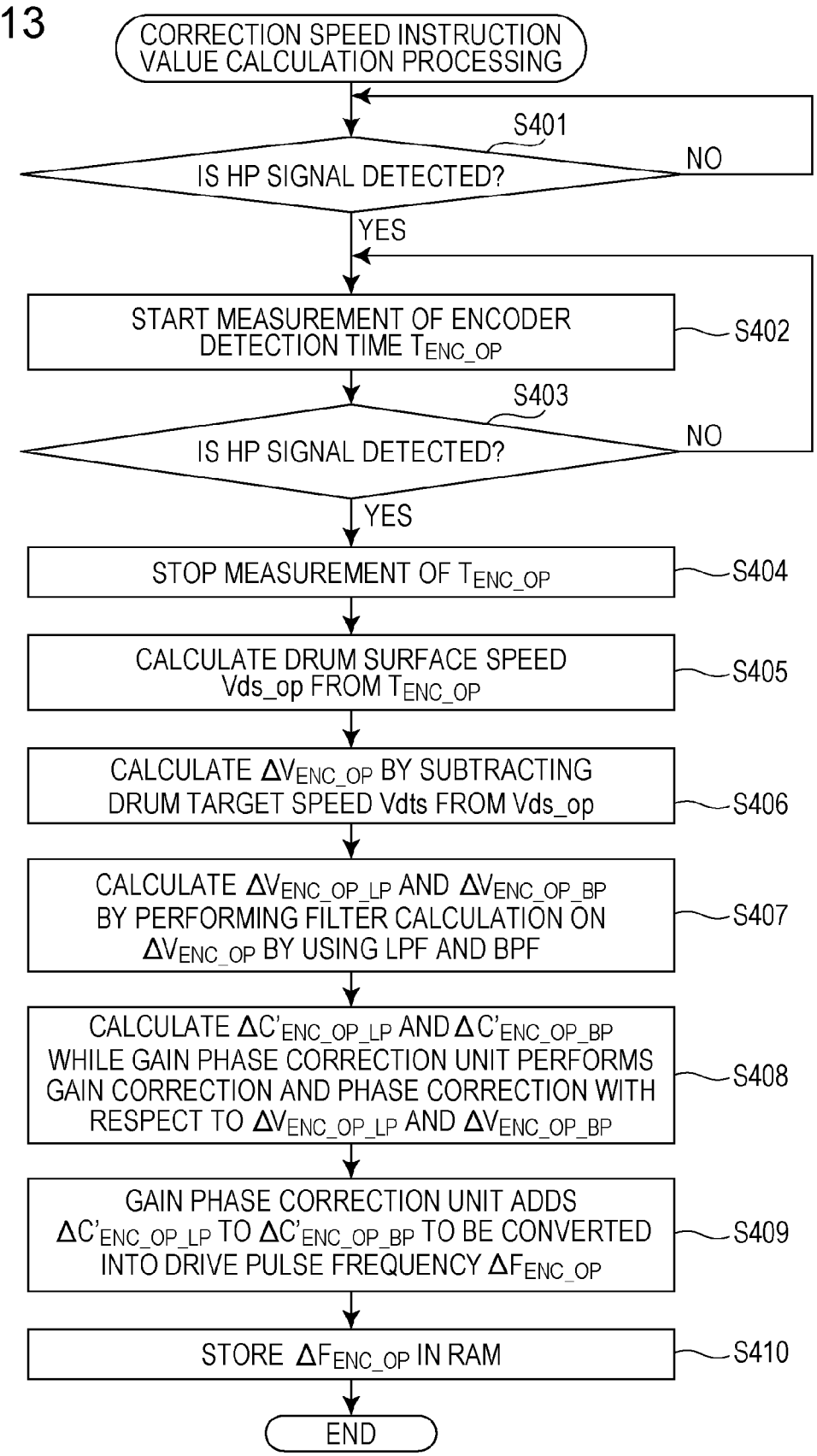
FIG. 13 is a flow chart for a procedure of correction speed instruction value calculation processing in step S103 in FIG. 12.

FIG. 13 is a flow chart for a procedure of the correction speed instruction value calculation processing in step S103 in FIG. 12. This correction speed instruction value calculation processing is processing with respect to one photosensitive drum 100. That is, this processing is executed with respect to each of the four sets of the photosensitive drum and the ITB 107.

In FIG. 13, when the HP signal is detected on the basis of the detection result of the sensor 33 (step S401: YES), the CPU 40 start measurement of the encoder detection time $T_{ENC\_OP}$ based on the detection results of the sensors 31 and 32. The opposite encoder detection unit 43 calculates the encoder detection time $T_{ENC\_OP}$ by using the encoder detection time $T_{ENC\_b}$ obtained from the output of the sensor 31 and the encoder detection time $T_{ENC\_c}$ obtained from the output of the sensor 32 (step S402). Subsequently, when the HP signal is detected again (step S403: YES), the CPU 40 stops the measurement of the encoder detection time $T_{ENC\_OP}$ (step S404).

The opposite encoder detection unit 43 then calculates the drum surface speed Vds_op on the basis of $T_{ENC\_OP}$ (step S405). Next, the opposite encoder detection unit 43 subtracts the drum target surface speed Vdts from Vds_op to calculate the speed fluctuation component $\Delta V_{ENC\_OP}$ (step S406). The filter processing is performed on the speed fluctuation component $\Delta V_{ENC\_OP}$ by using the LPF 44 to calculate $\Delta V_{ENC\_OP\_LP}$. Furthermore, the filter processing is performed on the speed fluctuation component $\Delta V_{ENC\_OP}$ by using the BPF 45 to calculate $\Delta V_{ENC\_OP\_BP}$ (step S407). Next, the gain phase correction units 46 and 47 perform the gain correction and the phase correction on each of $\Delta V_{ENC\_OP\_LP}$ and $\Delta V_{ENC\_OP\_BP}$ to calculate $\Delta C_{ENC\_OP\_LP}$ and $\Delta C_{ENC\_OP\_BP}$ (step S408). Thereafter, the correction speed calculation unit 48 adds $\Delta C_{ENC\_OP\_LP}$ to $\Delta C_{ENC\_OP\_BP}$ to be converted into the drive pulse frequency $\Delta F_{ENC\_OP}$ (step S409). Subsequently, the drive pulse frequency $\Delta F_{ENC\_OP}$ is stored in the RAM 42 (step S410), and the present processing is ended.

In this manner, since the speed correction amount at which the gain and the phase of the speed fluctuation component are corrected are calculated so as to cancel the speed fluctuation component, and the rotation speed of the rotator is corrected by using the calculated speed correction amount, it is possible to accurately suppress the rotation fluctuation component of the rotator that rotates for forming the image. It is noted that, according to the present exemplary embodiment, the correction speed instruction value calculation processing is performed before the print processing is performed, but the correction speed instruction value calculation processing may be performed at another timing. For example, the correction speed instruction value calculation processing may be performed when the power supply is activated or the mode is returned from the sleep processing.

The FF control in the drive control of the photosensitive drum has been described by using FIGS. 3A and 3B to FIG. 14.

The control is similarly performed not only with respect to the drive control of the photosensitive drum but also with respect to the ITB 107. That is, the CPU 40 of the control device 2 calculates the set of the correction speed instruction values for the ITB drive control on the basis of the detection result of the encoder 27. With regard to this set of the correction speed instruction values, as illustrated in FIG. 11, the correction speed instruction value is stored for each address equivalent to the slit number of the encoder 27. Subsequently, the FF control of the ITB is performed on the basis of this correction speed instruction value and the target drive pulse frequency of the ITB. Next, a modified example of the drive configuration of the photosensitive drum 100 described in FIG. 2 will be described. It is noted that this modified example is also similarly carried out not only with respect to the drive control of the photosensitive drum but also with respect to the ITB 107.

Figure 14:
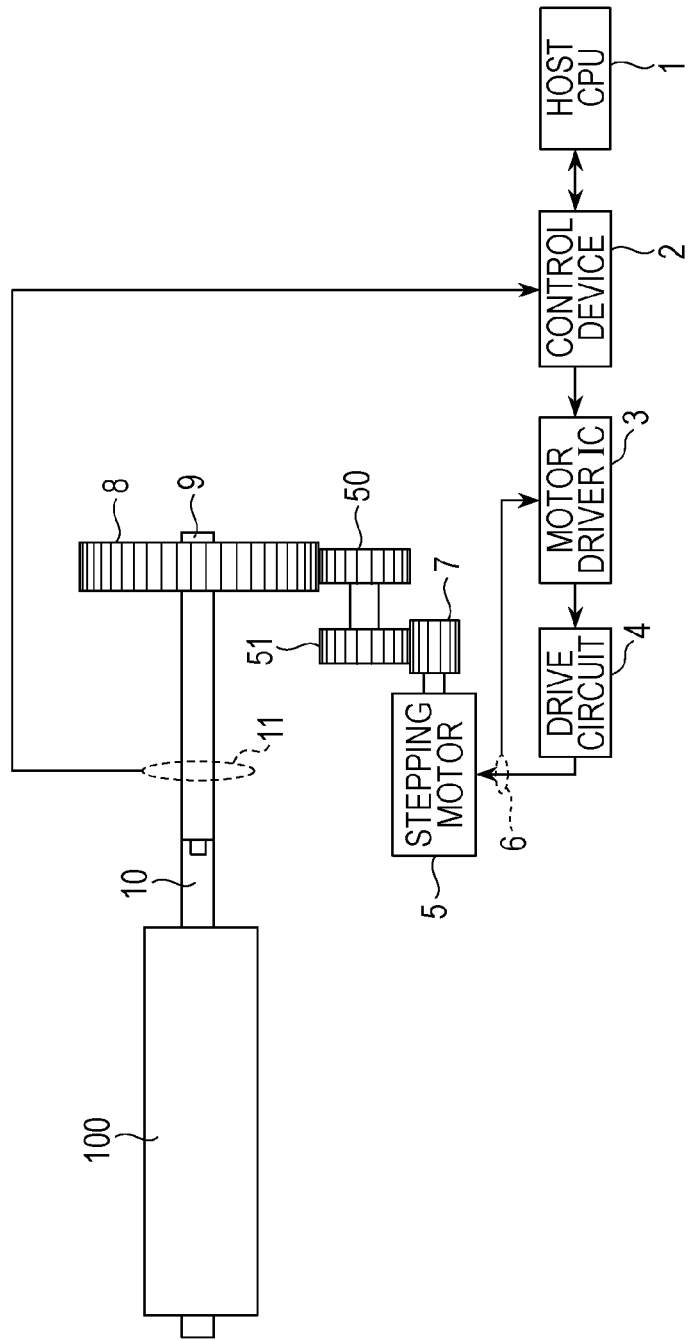
FIG. 14 illustrates a configuration for driving the photosensitive drum and the ITB.

FIG. 14 illustrates a configuration for driving the photosensitive drum 100 and the ITB 107. This configuration illustrated in FIG. 14 is common to the respective colors similarly as in FIG. 2, and therefore Y, M, C, and K are not added to the reference symbols. In addition, the configurations same as those in FIG. 2 are assigned with the same reference symbols.

A difference of the drive configuration illustrated in FIG. 14 from the drive configuration of FIG. 2 resides in that intermediate gears 50 and 51 are provided between the motor shaft gear 7 and the reduction gear 8. With this configuration, the gear ratio between the motor shaft gear 7 and the reduction gear 8 is increased. The number of gear teeth of the intermediate gear 50 is the same as the number of gear teeth of the intermediate gear 51.

It is noted that a ratio of the numbers of gear teeth of the motor shaft gear 7, the intermediate gear 51, and the reduction gear 8 is set as 1:2:9.

Although the rotation fluctuation component is also generated in the above-described configuration, since the shaft eccentricities of the intermediate gears 50 and 51 are different from each other in the present case, the rotation fluctuation component fg based on the shaft eccentricity is further generated as a combined component of those eccentricities. In view of the above, two BPFs are provided.

Figure 15A:
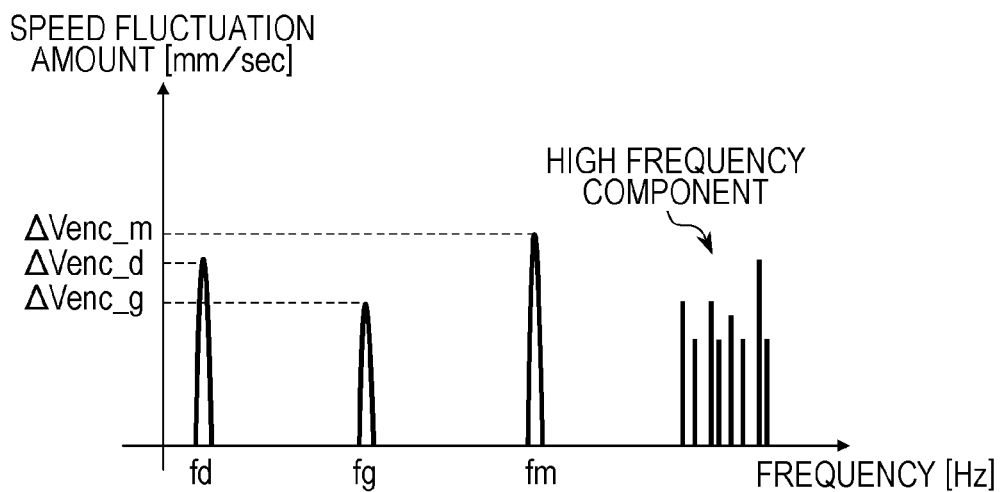
FIGS. 15A and 15B illustrate the rotation speed fluctuation component and filter characteristics of the LPF, a BPF_A, and a BPF_B.
Figure 15B:
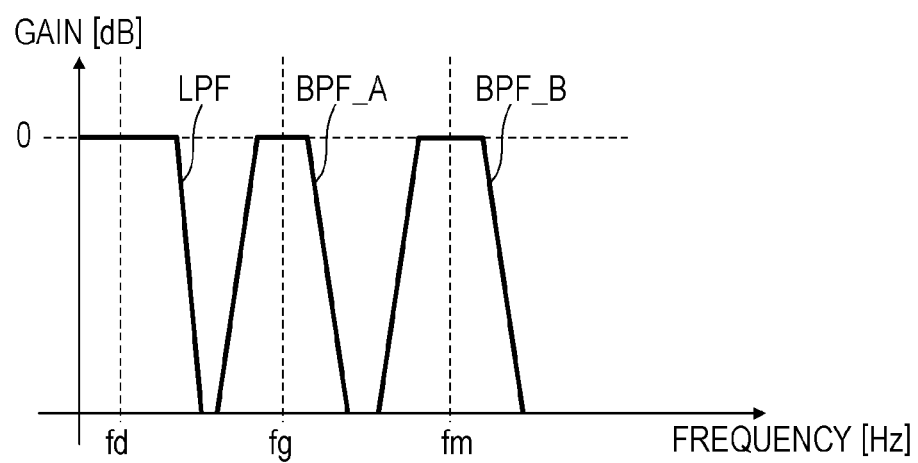

FIGS. 15A and 15B illustrate the rotation speed fluctuation component and filter characteristics of the LPF, a BPF_A, and a BPF_B.

In FIG. 15A, a vertical axis indicates the rotation speed fluctuation component detected by the encoder 11, and a horizontal axis indicates a frequency. As illustrated in FIG. 15A, other than the high frequency component, the rotation speed fluctuation component is also generated at fg in addition to fd and fm.

As illustrated in FIG. 15B, the LPF, the BPF_A, and the BPF_B are the filters provided with gain characteristics for taking out each of the rotation fluctuation components. In this case, the configuration of the CPU 40 corresponds to the three filters.

Figure 16:
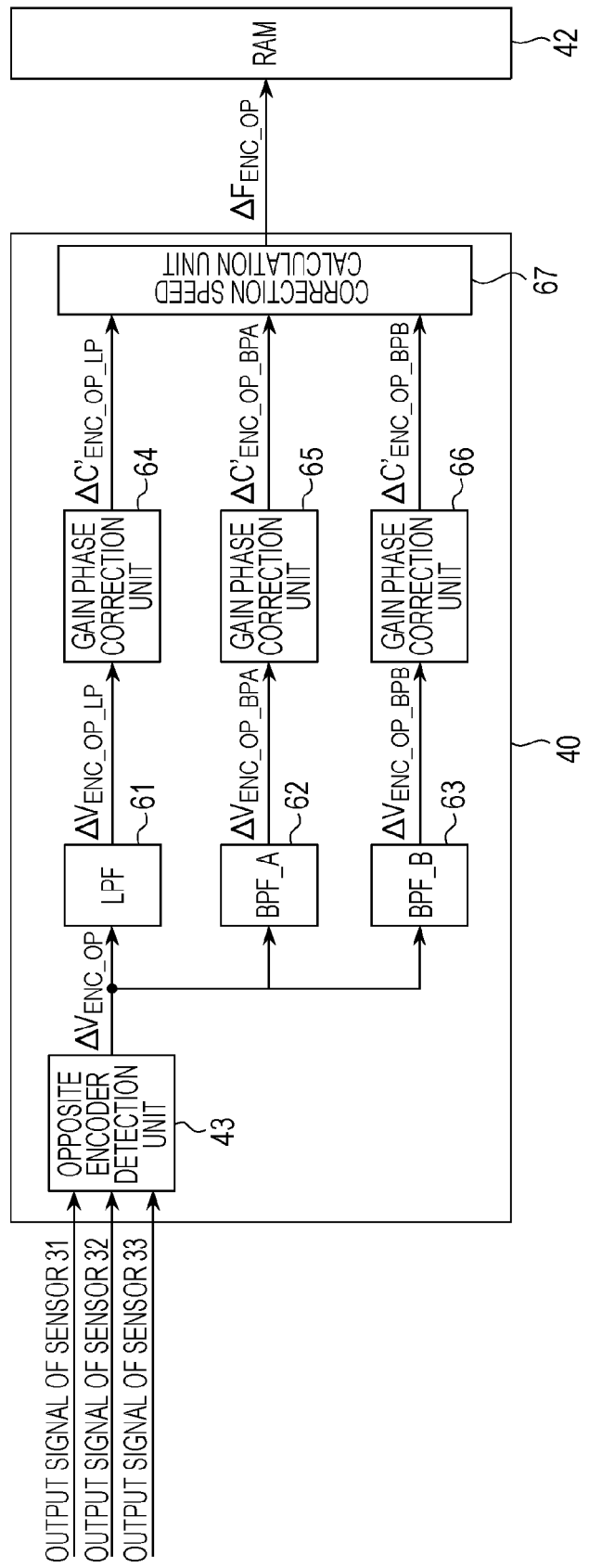
FIG. 16 is a block diagram illustrating functions of processings performed by the CPU in FIG. 5A.

FIG. 16 is a block diagram illustrating functions of processings performed by the CPU 40 in FIG. 5A.

In FIG. 16, the CPU 40 is constituted by the opposite encoder detection unit 43, an LPF 61, a BPF_A 62, a BPF_B 63, gain phase correction units 64, 65, and 66, and a correction speed calculation unit 67.

The output signal of the sensors 31, 32, and 33 are input to the opposite encoder detection unit 43, and the speed fluctuation component $\Delta V_{ENC\_OP}$ is output to the LPF 61, the BPF_A 62, and the BPF_B 63.

A result of filter processing on the input $\Delta V_{ENC\_OP}$ by using the LPF 61 is output as the speed fluctuation component $\Delta V_{ENC\_OP\_LP}$ to the gain phase correction unit 64.

A result of filter processing on the input $\Delta V_{ENC\_OP}$ by using the BPF_A 62 is output as the speed fluctuation component $\Delta V_{ENC\_OP\_BPA}$ to the gain phase correction unit 65.

A result of filter processing on the input $\Delta V_{ENC\_OP}$ by using the BPF_B 63 is output as the speed fluctuation component $\Delta V_{ENC\_OP\_BPB}$ to the gain phase correction unit 66.

The gain phase correction unit 64 to which $\Delta V_{ENC\_OP\_LP}$ has been input outputs a result obtained by performing the gain correction and the phase correction to the correction speed calculation unit 67 as the speed correction amount $\Delta C'_{ENC\_OP\_LP}$.

The gain phase correction unit 65 to which $\Delta V_{ENC\_OP\_BPA}$ has been input outputs a result obtained by performing the gain correction and the phase correction to the correction speed calculation unit 67 as the speed correction amount $\Delta C'_{ENC\_OP\_BPA}$.

The gain phase correction unit 66 to which $\Delta V_{ENC\_OP\_BPB}$ has been input outputs a result obtained by performing the gain correction and the phase correction to the correction speed calculation unit 67 as the speed correction amount $\Delta C'_{ENC\_OP\_BPB}$.

The correction speed calculation unit 48 to which the speed correction amounts $\Delta C'_{ENC\_OP\_LP}$, $\Delta C'_{ENC\_OP\_BPA}$, and $\Delta C'_{ENC\_OP\_BPB}$ have been input adds $\Delta C'_{ENC\_OP\_LP}$, $\Delta C'_{ENC\_OP\_BPA}$, and $\Delta C'_{ENC\_OP\_BPB}$ one another to obtain $C'_{ENC\_OP}$ as a result of the addition and outputs the drive pulse frequency $\Delta F_{ENC\_OP}$ that is obtained by converting $C'_{ENC\_OP}$ into the drive pulse frequency of the stepping motor 5 to the RAM 42.

As illustrated in the above-described modified example, in a case where the intermediate gears 50 and 51 functioning as the other gears arranged to transmit the rotation by the drive unit to the reduction gear 8 are provided, the other filter BPF_A that passes the frequency of the eccentricity component of the other gear shaft is further provided. Subsequently, the gain phase correction unit 65 and the correction speed calculation unit 67 further perform the calculation with respect to the speed fluctuation component on which the filter processing has been performed by using the other filter BPF_A, and the CPU 40 controls the rotation speed of the rotator on the basis of the drive pulse frequency obtained by further adding the calculated speed correction amount to the speed fluctuation component caused by the other gear.

As described above, according to the present exemplary embodiment, since the speed correction amount at which the gain and the phase of the speed fluctuation component are corrected so as to cancel the speed fluctuation component is calculated, and the rotation speed of the rotator is controlled by the gain phase correction unit and the correction speed calculation unit by using the calculated speed correction amount, it is possible to accurately suppress the rotation fluctuation component of the rotator that rotates to form the image.

In addition, since the FF control is not to be repeatedly performed, it is possible to accurately suppress the rotation fluctuation component without extending a first copy time (FOOT).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-072491, filed Mar. 31, 2014, which is hereby incorporated by reference herein in its entirety.

What is claimed is:

1. An image forming apparatus comprising:
   a drive unit that drives a rotator that rotates to form an image;
   a speed detection unit that detects a rotation speed of the rotator;
   a fluctuation component calculation unit that calculates a speed fluctuation component with respect to a previously set target speed on the basis of the rotation speed detected by the speed detection unit;
   a first filter processing unit that extracts a component having a first frequency from the speed fluctuation component;
   a second filter processing unit that extracts a component having a second frequency different from the first frequency from the speed fluctuation component;
   a first correction unit that performs a gain correction and a phase correction on the component extracted by the first filter processing unit;
   a second correction unit that performs a gain correction and a phase correction on the component extracted by the second filter processing unit;
   a speed correction amount calculation unit that calculates a speed correction amount by adding output values of the first correction unit and the second correction unit to each other;
   a storage unit that stores the speed correction amount while being associated with information related to a rotation position of the rotator; and
   a control unit that reads out the speed correction amount in accordance with the rotation position of the rotator from the storage unit and controls the rotation speed of the rotator on the basis of information related to the target speed of the rotator and the speed correction amount read out from the storage unit.

2. The image forming apparatus according to claim 1, further comprising:
   a reduction gear that transmits drive force by the drive unit to the rotator,
   wherein the first filter processing unit extracts a component derived from the reduction gear,
   wherein the second filter processing unit extracts a component derived from the rotator, and
   wherein a frequency of the component extracted by the second filter processing unit is higher than a frequency of the component extracted by the first filter processing unit.

3. The image forming apparatus according to claim 2,
   wherein the first filter processing unit includes a low-pass filter, and
   wherein the second filter processing unit includes a band-pass filter.

4. The image forming apparatus according to claim 3,
   wherein the frequency extracted by the band-pass filter of the second filter processing unit includes a frequency obtained by multiplying a frequency of the component derived from the reduction gear by a gear ratio of the reduction gear.

5. The image forming apparatus according to claim 1, wherein the drive unit includes a stepping motor.

6. The image forming apparatus according to claim 1,
   wherein the rotator is a photosensitive drum,
   wherein the image forming apparatus further includes a first photosensitive drum and a second photosensitive drum that form color toner images different from each other,
   wherein the drive unit includes a first drive unit and a second drive unit that respectively drive the first photosensitive drum and the second photosensitive drum,
   wherein the speed detection unit includes a first speed detection unit that detects a rotation speed of the first photosensitive drum and a second speed detection unit that detects a rotation speed of the second photosensitive drum, and
   wherein the speed correction amount calculation unit calculates the speed correction amount with respect to each of the first photosensitive drum and the second photosensitive drum.

7. The image forming apparatus according to claim 6, further comprising:
   an intermediate transfer belt onto which a first toner image and a second toner image formed on the first photosensitive drum and the second photosensitive drum are transferred; and
   a transfer unit that transfers the toner images transferred onto the intermediate transfer belt are transferred onto a recording medium.

8. The image forming apparatus according to claim 1, wherein the speed detection unit includes two sensors that detect positions shifted from each other by half a circumference.

9. The image forming apparatus according to claim 8, wherein the speed detection unit further includes a sensor that detects a home position.

* * * * *